United States Patent [19]

Stansfield et al.

[11] Patent Number: 4,774,567
[45] Date of Patent: Sep. 27, 1988

[54] REPRODUCTION OF COLORED IMAGES INCLUDING OVERPRINTING FOR REPRODUCTION OF BRIGHT COLORS

[75] Inventors: Peter W. Stansfield, Hertfordshire; Alastair Reed, Bedfordshire, both of England

[73] Assignee: Crosfield Electronics Limited, London, United Kingdom

[21] Appl. No.: 97,011

[22] Filed: Sep. 16, 1987

[30] Foreign Application Priority Data

Sep. 19, 1986 [GB] United Kingdom ................ 8622564

[51] Int. Cl.$^4$ ........................... H04N 1/46; G03F 3/08
[52] U.S. Cl. ......................................... 358/80; 358/75
[58] Field of Search .................................. 358/75, 80

[56] References Cited

U.S. PATENT DOCUMENTS

| | | | |
|---|---|---|---|
| 4,349,835 | 9/1982 | Horiguchi et al. | 358/80 X |
| 4,551,751 | 11/1985 | Jung | 358/75 |
| 4,613,897 | 9/1986 | Stansfield | 358/80 |
| 4,614,967 | 9/1986 | Sayanagi | 358/75 |
| 4,647,963 | 3/1987 | Johnson et al. | 358/75 X |
| 4,670,780 | 6/1987 | McManus et al. | 358/75 X |
| 4,683,492 | 7/1987 | Sugiura et al. | 358/75 X |

FOREIGN PATENT DOCUMENTS 1228878  4/1971  United Kingdom .

Primary Examiner—James J. Groody
Assistant Examiner—E. Anne Faris
Attorney, Agent, or Firm—Sughrue, Mion, Zinn, Macpeak & Seas

[57] ABSTRACT

In color printing it is customary to print images in a combination cyan, magenta, and yellow printing inks. However, it is sometimes required in the printing of the final image, to include an ink of a special color, for example a brown ink, which cannot be reproduced by combining cyan, magenta and yellow inks. The present invention is concerned with the preparation of a special color printer for a special printing ink. According to the invention sets of values ($C_{ROP}$, $M_{ROP}$, $Y_{ROP}$, $K_{ROP}$) defining the characteristic elements of curves for cyan, magenta, yellow, and black, which curves together correspond to a range of values for the overprinted colored separation, are stored. For each picture element, a combination of color component values for cyan, magenta, yellow and black (C,M,Y,K) are derived and compared with different sets of values ($C_{ROP}$, $M_{ROP}$, $Y_{ROP}$, $K_{ROP}$) derived from the stored curve elements, each set corresponding to a different value of the overprinted special color separation ($R_{OP}$). A value is selected for the desired special color separation for which each of the stored values of the related set ($C_{ROP}$, $M_{ROP}$, $Y_{ROP}$, $K_{ROP}$) is not greater than the corresponding value (C,M,Y,K) derived from the picture element of the original. The stored values ($C_{ROP}$, $M_{ROP}$, $Y_{ROP}$, $K_{ROP}$) are then subtracted from the corresponding values (C,M,Y,K) to get residual values (C',M',Y', K'). The residual values (C',M',Y',K') are then modified to give a corresponding set of modified values (C'',M',Y',K') and a special color separation value (R) is selected which is overprinted to constitute the selected overprinted special color.

5 Claims, 4 Drawing Sheets

REPRODUCTION OF COLORED IMAGES INCLUDING OVERPRINTING FOR REPRODUCTION OF BRIGHT COLORS

FIELD OF THE INVENTION

Colour printing is normally carried out by making a set of individual black-and-white colour separation transparencies, each having density values corresponding to the values in the original of the colour component which the separation represents. It is customary to produce colour separations from the red, green and blue components and to use these to make colour printers which are used to print images in cyan, magenta and yellow respectively, these colours being complementary to the red, blue and green of the filters. Colour correction is carried out before the colour printers are produced to compensate for various process non-linearities and also for the fact that the cyan, magenta and yellow printer inks are not exactly complementary in colour to the red, green and blue filters.

It is sometimes required, in the printing of the final image, to include an ink of a different colour, for example a brown ink. The use of a brown ink is particularly advantageous in the food packaging industry, where very careful control over different brown tones is required. There is a further factor, namely that the colours which can be obtained using the conventional printing colours are limited by the colour triangle for these colours and many brown tones fall outside this colour triangle.

DESCRIPTION OF THE PRIOR ART

In our copending European Patent Application No. 00184289, of which U.S. Pat. No. 4,613,897 is the U.S. equivalent we describe a method and apparatus for producing a special colour separation for a colour component other than cyan, yellow, magenta and black. The invention described in this European Specification is particularly useful in connection with the generation of a brown colour separation.

Typically, the special colour separation is used to represent not only areas which can be reproduced using the pure special colour ink but also other areas which would normally require three or more "normal" colour separations such as cyan, magenta, and yellow. If this duplication of use of the special colour separation was not achieved, an undesirable number of printing stages would be required to reproduce the original feature.

In order to reproduce these "non-pure" special ink areas, it is necessary to colour match different tones of the special colour with equivalent "normal" colour component combinations. In the case of several tones of the special ink, this presents no problem but for certain tones, particularly in the case of bright inks such as a bright red ink, the quantity of one or more of the normal colour components required to define a colour equivalent to that tone of the special colour has a negative value. That is, when the bright colour is viewed by a spectrophotometer-based colour matching system, this will indicate that a negative quantity of a particular colour component is required. Clearly, a negative quantity has no real existence and so is impossible to represent in printed form to enable colour match verification to take place.

In this context "tone" encompasses one or both of the saturation and intensity of a colour. Thus in a half-tone representation, a variation in tone of a colour component corresponds to a variation in dot size.

SUMMARY OF THE INVENTION

In accordance with one aspect of the present invention, we provide a method of reproducing a coloured original picture as a number of first and second colour separations, in which the first separation comprises a special colour separation representing a colour component at least some tones of which are not reproducable from a combination of the colour components represented by the other, second colour separations, the method comprising (i) storing values defining at least the characteristic elements of curves which respectively represent second colour component values which together correspond to a range of values for the required special colour separation when overprinted with a colour such that the resultant overprinted special colours are each reproducable from combinations of the second colour components;

(ii) comparing the colour components defining the colour content of each picture element of the original picture with different sets of second colour component values derived from the above-mentioned curves and corresponding to different values for the overprinted special colour;

(iii) selecting a value for the overprinted special colour for which each of the second colour component values of the corresponding set is not greater than the corresponding colour component values derived from the picture element and determining first modified values for the second colour components of the picture element after removing the second colour components corresponding to the selected overprinted special colour;

(iv) selecting a value for the special colour separation corresponding to the special colour which is overprinted to constitute the selected overprinted special colour; and (v) modifying the first modified values for the second colour components of the picture element in accordance with the second colour component or components defining the colour used to overprint the selected special colour, to generate selected values for the second colour separations, whereby the original colour of the picture element is reproduced by overprinting the selected value of the special colour separation and the selected values of the second colour separations.

With is invention, the special colour, typically in a variety of steps or tones, is overprinted with another colour so that the resultant colours can also be defined in terms of the second colour components. These overprinted colours are then colour matched with other colours produced by combination of the second colour components only, in a conventional manner, in order to generate the curves mentioned above.

When it is desired to reproduce an area of an original picture which does not constitute a pure form of the special colour, each pixel of that area is compared in terms of its second colour component values with the curves defining the overprinted special colour. It should be noted here that the colour used to overprint the special colour is chosen so that the resultant overprinted colours never require a negative quantity of a second colour component to define them.

This allows each area of the original picture to be defined in terms of the overprinted colour and residual amounts of the second colour components. The overprinted colour is then "added" in terms of its second colour components to the residual second colour component values to produce a set of final colour component values for each of the special colour and second colour components.

It should be understood in this context that the terms "add" and "subtract" do not necessarily mean a simple addition or subtraction since in general colour components do not add or subtract linearly.

In general, the curves will be defined by printing a tone scale of the special colour which is then overprinted. The scale may include two or more different tones.

Preferably, the colour used to overprint is a pure form of one of the second colour components. The overprinted colour preferably also has the same colour components for each tone of the special colour although in some circumstances the colour component quantities could vary.

In accordance with a second aspect of the present invention, apparatus for reproducing a coloured original picture as a number of first and second colour separations in which the first separation comprises a special colour separation representing a colour component at least some tones of which are not reproducable from a combination of the colour components represented by the other, second colour separations comprises a store for storing values defining at least the characteristic elements of curves which respectively represent second colour component values which together correspond to a range of values for the required special colour separation when overprinted with a colour such that the resultant overprinted special colours are each reproducable from combinations of the second colour components; comparison means for comparing the colour components defining the colour content of each picture element of the original picture with different sets of second colour component values derived from the above-mentioned curves and corresponding to different values for the overprinted special colour, and for selecting a value for the overprinted special colour for which each of the second colour component values of the corresponding set is not greater than the corresponding colour component values derived from the picture element; and processing means for removing the second colour components corresponding to the selected overprinted special colour from the second components of the picture element to determine the first modified values for the second colour components of the picture element, for selecting a value for the special colour separation corresponding to the special colour which is overprinted to constitute the selected overprinted special colour, and for modifying the first modified values for the second colour components of the picture element in accordance with the second colour component or components defining the colour used to overprint the selected special colour, to generate selected values for the second colour separation, whereby the original colour of the picture element is reproduced by overprinting the selected value of the special colour separation and the selected values of the second colour separations.

Typically, the comparison means and processing means will be provided by a suitably programmed computer.

BRIEF DESCRIPTION OF THE DRAWINGS

An example of a method and apparatus according to the present invention will now be described with reference to the accompanying drawings, in which.

DETAILED DESCRIPTION OF AN EMBODIMENT

Figure 1A:
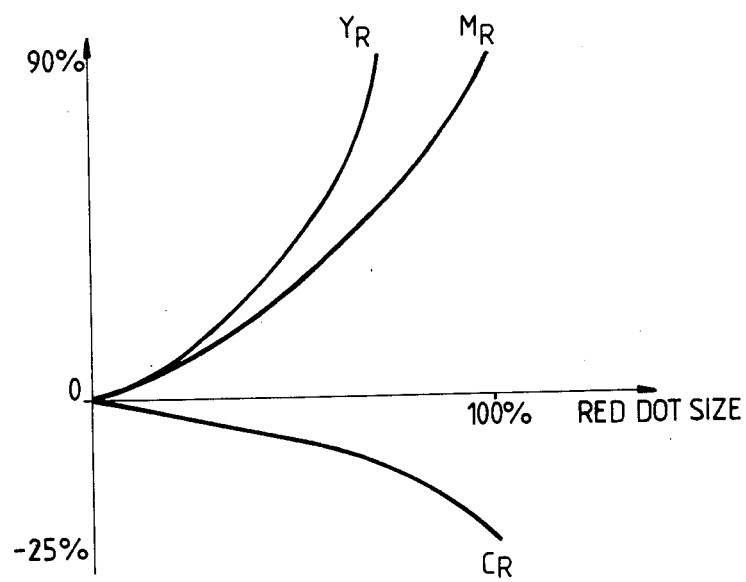
FIG. 1A shows curves of yellow, magenta, and cyan values corresponding to different values of a special colour separation.

For the purpose of this description, it will be assumed that the required special colour is a red and it will be seen in FIG. 1A that for all red dot sizes a negative quantity of the cyan colour component is required in combination with positive quantities of yellow and magenta colour components to represent the red colour. For example, a 100% red dot is defined by 90% yellow, 90% magenta, and $-25\%$ cyan. As shown by the curves, these percentage values are not maintained throughout the range of red dot sizes (0–100%). The reason for this is that inks are not simply proportional, colour intensity varies non-linearly with ink thickness, and dot percentage is non-linear with density.

The derivation of these curves is empirical and the curves are usually defined by storing representative values of each curve and using interpolation techniques to define intermediate points.

In practical applications, it is necessary to check the form of the curves shown in FIG. 1A by colour matching between a scale of red values printed using the special red ink and an equivalent scale of "reds" generated by overprinting cyan, magenta, and yellow inks. Although this is a practical possibility for ranges of special inks, at least some of the tones fall outside the printable range due to the fact that negative quantities of one or more of the components is required. In the case of the red ink illustrated in FIG. 1A, none of the red tones can be reproduced by a simple combination of the three printing inks.

Figure 2:
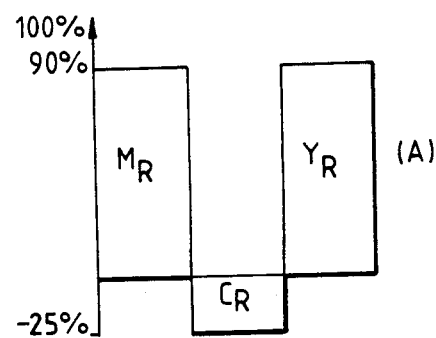
FIGS. 2A-2D are histograms illustrating different steps in the method.
Figure 2:
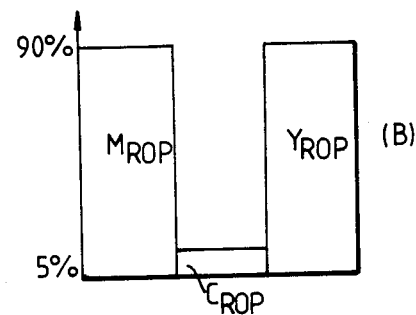
Figure 2:
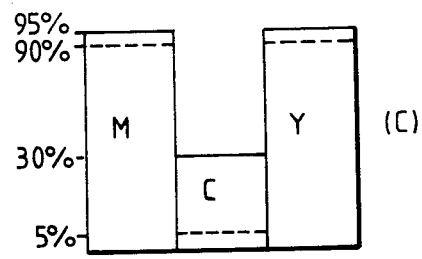
Figure 2:
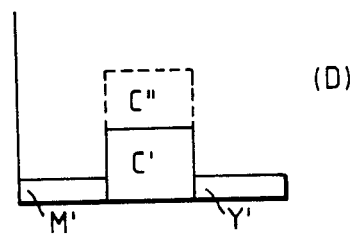

FIG. 2A illustrates in histogram form the quantities of the magenta, cyan, and yellow inks ($M_R$, $C_R$, $Y_R$) required to produce a 100% red dot.

The invention deals with the problem of negative quantity colour components by overprinting a scale of red tones with an ink having a sufficient quantity of the cyan colour component that the resultant overprinted colours all include positive quantities of each colour component. Typically, the red scale will be overprinted with a quantity of cyan, such as 30% dot size cyan, resulting in a colour having components ($M_{ROP}$, $C_{ROP}$, $Y_{ROP}$) as shown in FIG. 2B. If the special ink had more than one colour component with a negative dot size, it will be necessary to overprint with a colour having more than one of the colour components.

Figure 1B:
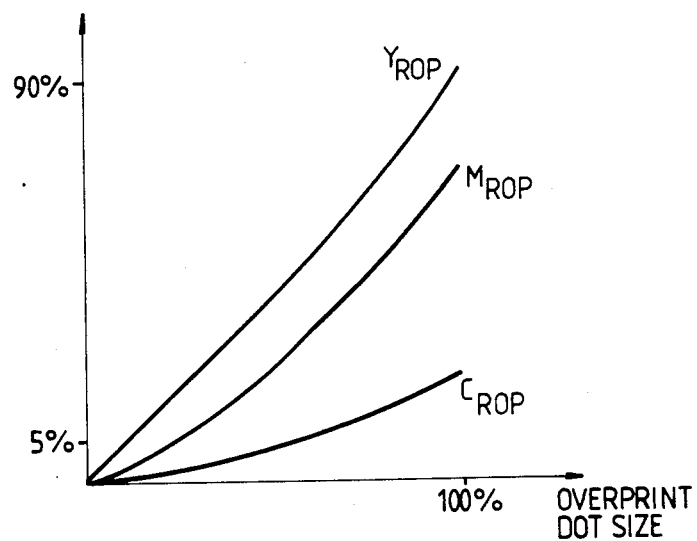
FIGS. 1B is similar to FIG. 1A but for the overprinted special ink.

The resultant overprinted red scale is then colour matched using a spectrophotometer-based colour matching system in a conventional manner with a scale produced by using the cyan, yellow, and magenta inks only to produce a revised set of curves for the overprinted special colour which have been colour matched with the standard scale. The revised curves are shown in FIG. 1B. It should be understood that the colour matching process is an iterative technique and may require one or more further steps of printing a scale of the overprinted special ink as defined by the curves of FIG. 1B, comparing this with a scale produced from the three normal colour components (C,M,Y) and modifying the stored curves.

An original picture can now be represented in terms of a dot size of the overprinted special ink and residual dot sizes for the other printing ink components. Consider for example a pixel of the original picture having colour components (M,C,Y) of 95% magenta, 35% cyan, and 95% yellow. These values are compared with the different sets of $M_{ROP}$, $C_{ROP}$, and $Y_{ROP}$ values obtained from the curves shown in FIG. 1B (each set of values obtained from these curves corresponding to an overprinted red dot of a different size) to find the maximum size of overprinted red ink dot which can be removed. In this case, a 100% overprinted red dot has colour components all of which are less than the colour components of the pixel as illustrated in FIG. 2C (where 100% overprinted red is indicated by dashed lines). Thus, the amount of "overprinted red" that can be removed from the pixel is represented by the amounts below the dashed line in FIG. 2C. These amounts can either be wholly replaced by an overprinted red signal, or partially replaced (for example using an overprinted red signal and a black printer signal).

The residual signals (M',C',Y') indicated by solid lines in FIG. 2D are then additively corrected.

The result of this process is that the original picture pixel is defined in terms of three residual printing ink colour components magenta, cyan, and yellow (M',C',Y') and an "overprinted red" colour component. The "overprinted red" colour component is converted back to a red dot size (corresponding to the red dot size which is overprinted) and a quantity of cyan corresponding to the original quantity of cyan used to overprint the red scale (eg. 30%). The quantity of cyan is added with suitable colour correction to the previously determined cyan component as indicated by the dashed line in FIG. 2D to yield a total cyan component C".

For example, ignoring the effects of any additivity correction, if the original cyan density used in the overprint was 30% then the "overprinted red" dot size determined for the pixel will be equivalent to 100% red dot size plus 30% cyan. It is therefore necessary to print this additional 30% cyan as well as a residual cyan component together with 100% red, 5% magenta, and 5% yellow.

Figure 3:
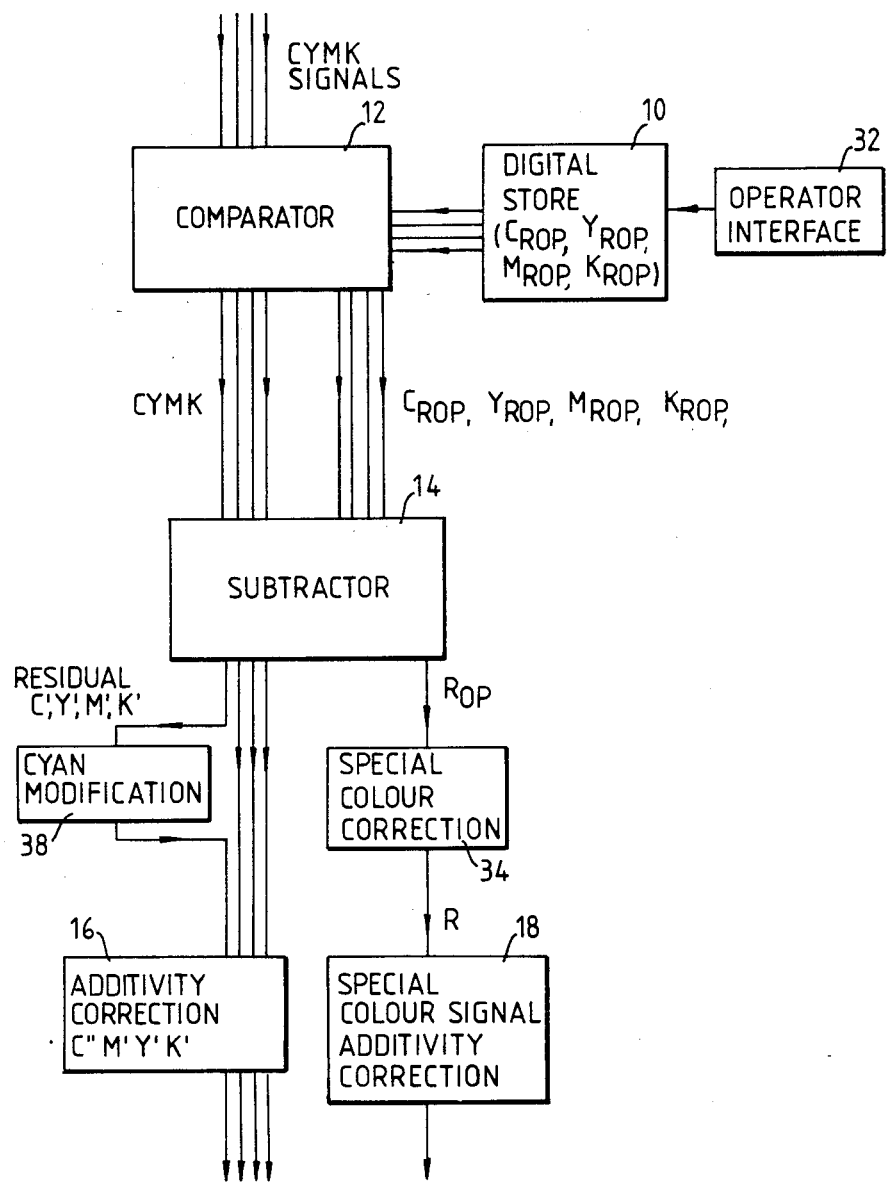
FIG. 3 shows diagrammatically one embodiment of a circuit for carrying the invention into effect; and, FIG. 4 is a flow diagram illustrating the operation of the circuit in FIG. 3.
Figure 4:
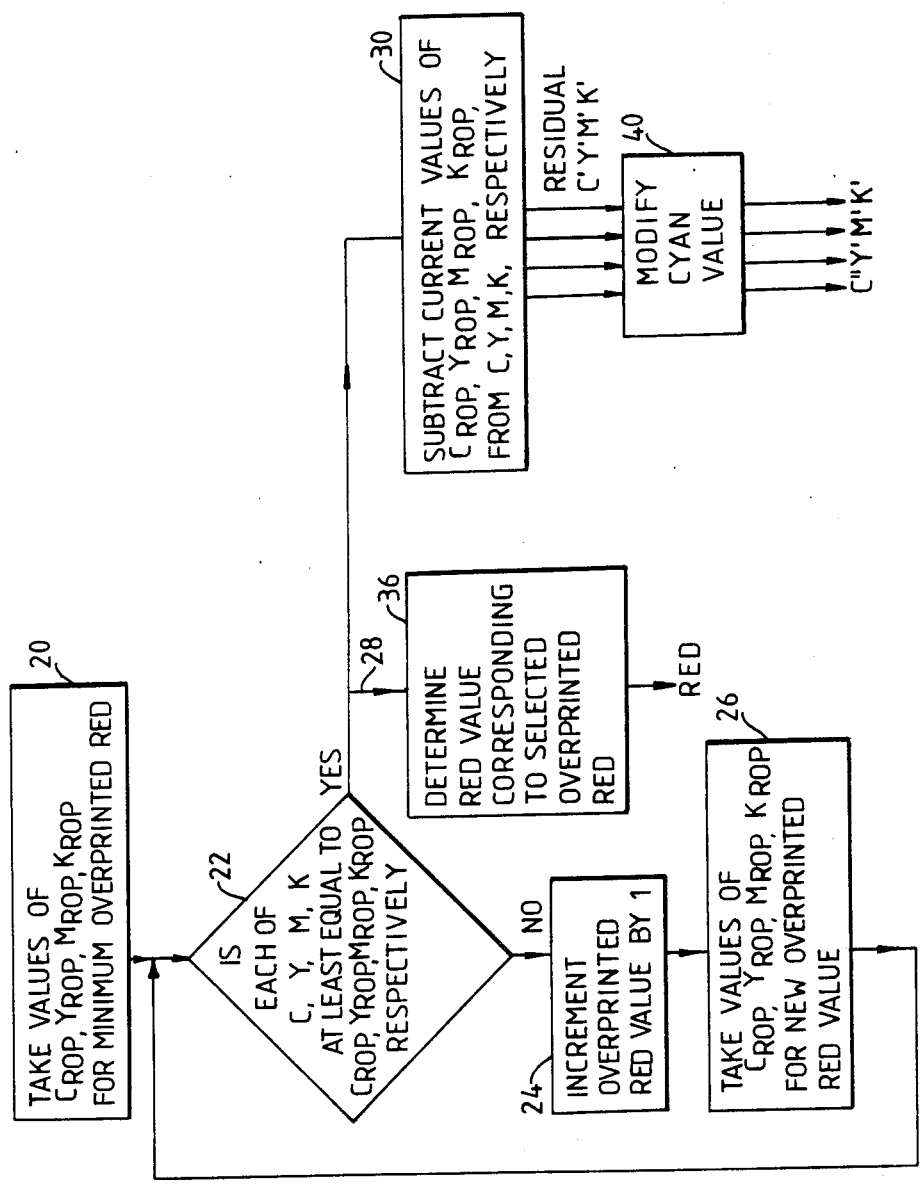

A diagrammatic representation of the circuits necessary to carry out the invention is given in FIG. 3 and a flow diagram illustrating the operation of the circuit is shown in FIG. 4. In FIG. 3, the reference 10 indicates an indexed data store for the overprinted special colour separation ink (in this example red), i.e. a store holding data representing the curves of FIG. 1B, except that in the case of FIG. 3 a black curve ($K_{ROP}$) is also included. As mentioned previously this data will have been generated by colour matching the overprinted special colour. Input pixels (C, M, Y, K) for the image elements are applied to a comparator 12 connected to the store 10. Initially values of $C_{ROP}$, $Y_{ROP}$, $M_{ROP}$ and $K_{ROP}$ for minimum red are taken from store 10 and applied to the comparator (see step 20 in FIG. 4) The comparator checks to ascertain whether each of the C, M, Y and K values for a given picture element is not less than, i.e. at least equal to the corresponding one of a set of stored values for the selected red dot size (step 22). If any one of the C, M, Y and K picture-element values is less than the corresponding stored value, the data store index is incremented by one (step 24), values of $C_{ROP}$, $Y_{ROP}$, $M_{ROP}$ and $K_{ROP}$ for the next red value are extracted from store (step 26), and step 22 is repeated i.e. the comparator check is made again using the new values. When all of the C, M, Y and K picture-element values are at least equal to the corresponding $C_{ROP}$, $M_{ROP}$, $Y_{ROP}$, and $K_{ROP}$ values i.e. when step 22 gives a positive answer, then that value of the index becomes the "overprinted red" value $R_{OP}$ (line 28). The $C_{ROP}$, $M_{ROP}$, $Y_{ROP}$ and $K_{ROP}$ stored equivalents for this overprinted red value are then subtracted (step 30) from the incoming pixel values in a subtractor circuit 14 (FIG. 3) to "correct" for the overprinted red separation.

The "overprinted red" signal $R_{OP}$ is then corrected (step 36) to a red signal R by using the $R_{OP}$ signal to address a look-up table 34 holding equivalent red signal values R, i.e. each value R when overprinted results in the corresponding $R_{OP}$ value.

The residual cyan signal C' is then modified in a circuit 38 (step 40) by adding to it the amount of cyan originally used to overprint the red signal to produce the corresponding $R_{OP}$ signal. This will typically be a constant value. This modification results in a modified residual cyan signal C".

The residual signals M', Y' and K', the modified residual cyan signal C" and the red signal R are corrected for additivity failure in circuits 16 and 18 respectively. The circuits 16 and 18 are of known design and form no part of the present invention.

Of course, partial replacement can be achieved by comparing for example 60% of the incoming pixel values with the stored values; alternatively, an operator may define at an operator interface 32, how much of the maximum red value is reproduced in red ink.

It will be seen that this method takes into account the non-linear nature of the curves shown in FIGS. 1A and 1B. The non-linear nature of the curves is due to two types of ink non-linearity. One of these, termed "proportionality" relates to the non-linear effects which appear to change the colour of one ink (printed alone) with dot size. Another, termed "additivity" relates to the combination of non-linear effects which make densities add together in a non-linear manner when one ink is overprinted with another.

Once the data store 10 has been loaded for the overprinted special colour separation, no adjustment is required.

We claim:

1. A method of reproducing a coloured original picture comprising a plurality of picture elements, for which a colour content of each of said picture elements is definable as an original combination of original colour components, as a number of first and second colour separations, in which said first separations comprise a first combination of colour components and said second separation comprises a special colour separation representing a colour component at least some tones of which are not reproducable from said first combination of colour components represented by said first separations, said method comprising:

(i) storing values defining at least characteristic elements of curves which respectively represent first colour component values which together correspond to a range of values for a required special colour separation when overprinted with a colour such that overprinted special colours resulting from overprinting are each reproducable from combination of said first colour components;

(ii) comparing (22) said original colour components defining the colour content of each of said picture elements of said original picture with different sets of said first colour component values derived from said curves and corresponding to different values for said overprinted special colours;

(iii)
(a) selecting a value for said overprinted speical colours for which each of said first colour component values of a corresponding set is not greater than corresponding original colour component values derived from said each of said picture elements and (b) removing (30) said first colour components corresponding to said selected value of said overprinted special colours to determine first modified values for said second colour components of said each of said picture elements;

(iv) selecting a value (36) for said required special colour separation corresponding to the special colours which are overprinted to constitute said selected overprinted special colours; and (v) modifying (40) said first modified values for said first colour components in accordance with said selected value used to overprint said selected special colours, to generate selected values for said first colour separations, whereby said each of said picture elements is reproduced by overprinting said selected value of said special colour separation and said selected values of said first colour separations.

2. A method according to claim 1, wherein said selected value of said overprinted special colours consists of a pure form of one of said first colour components.

3. A method according to claim 1, wherein said overprinted special colours has the same colour components for each tone of said special colours.

4. Apparatus for reproducing a coloured original picture comprising a plurality of picture elements, for which a colour content of each of said picture elements is definable as an original combination of original colour components, as a number of first and second colour separations, in which said first separations comprise a first combination of colour components and said second separation comprises a special colour separation representing a colour component at least some tones of which are not reproducable from said first combination of colour components represented by said first separations, the apparatus comprising:

a store (10) for storing values defining at least characteristic elements of curves which respectively represent first colour component values which together correspond to a range of values for a required special colour separation when overprinted with a colour such that overprinted special colours resulting from overprinting are each reproducable from combinations of said first colour components;

comparison means (12) for comparing said original colour components defining the colour content of each of said picture elements of said original picture with different sets of said first colour component values derived from said curves and corresponding to different values for said overprinted special colours, and for selecting a value for said overprinted special colours for which each of said first colour component values of a corresponding set is not greater than the corresponding original colour component values derived from each of said picture elements; and processing means (14, 16, 18, 34, 38) for removing said first colour components corresponding to said selected value of said overprinted special colours from said second components of said picture element to determine first modified values for said second colour components of said each of said picture elements, for selecting a value for said required special colour separation corresponding to said special colours which are overprinted to constitute said selected overprinted special colours, and for modifying said first modified values for said first colour components in accordance with said selected value used to overprint said selected special colours, to generate selected values for said first colour separations, whereby said each of said picture elements is reproduced by overprinting said selected value of said special colour separation and said selected values of said first colour separations.

5. Apparatus according to claim 4, wherein said comparison means and said processing means comprises a suitably programmed computer.

* * * * *